United States Patent [19]

Starniri

[11] Patent Number: 5,099,402
[45] Date of Patent: Mar. 24, 1992

[54] HANDRAIL ILLUMINATION SYSTEM

[76] Inventor: Rocco J. Starniri, 121 S. 15th St., Easton, Pa. 18042

[21] Appl. No.: 608,472

[22] Filed: Nov. 2, 1990

[51] Int. Cl.⁵ ............................................. F21V 33/00
[52] U.S. Cl. ..................... 362/146; 362/276; 362/802
[58] Field of Search ..................... 362/146, 276, 802

[56] References Cited

U.S. PATENT DOCUMENTS

| | | | |
|---|---|---|---|
| 2,766,372 | 10/1956 | Aibris | 362/146 |
| 3,569,689 | 3/1971 | Nestrock | 362/146 |
| 3,740,541 | 6/1973 | Conradt | 362/146 |
| 3,813,071 | 5/1974 | Noryd | 362/146 X |

Primary Examiner—Ira S. Lazarus
Attorney, Agent, or Firm—Fleit, Jacobson, Cohn, Price, Holman & Stern

[57] ABSTRACT

The invention is a handrail illumination system that will provide uniform distribution of illumination on stairways, walkways and the like that is completely integrated within a handrail and includes a control circuit which energizes light assemblies automatically when any point on the surface of a wood handrail senses anatomical contact or anatomical proximity thereby eliminating the necessity of locating and actuating manually operated wall switches. The anatomical contact or proximity switch will remain in the on position for the duration of anatomical contact or proximity with a time delay switching the lamps to off position when anatomical contact or proximity terminates. The illuminating lamps and associated structure are incorporated into housings built into the handrail and the control circuit structure is likewise incorporated into a housing incorporated into the handrail. The anatomical contact or proximity sensing switch and related circuit provides for a manual adjustment of the time delay for switching lamps off when anatomical contact or proximity is terminated with the handrail illumiantion system also including self-adjustment in response to variations in ambient conditions for maintaining appropriate operating conditions of the system. The handrail includes a horizontal portion when used with a stairway to extend over the landings for anatomically switching the lamps on prior to engaging the steps in a stairway. The handrail includes a gripping arrangement in which the side panels enable engagement by the thumb and fingers throughout the length thereof with the control circuit providing a safe and dependable illumination system.

11 Claims, 4 Drawing Sheets

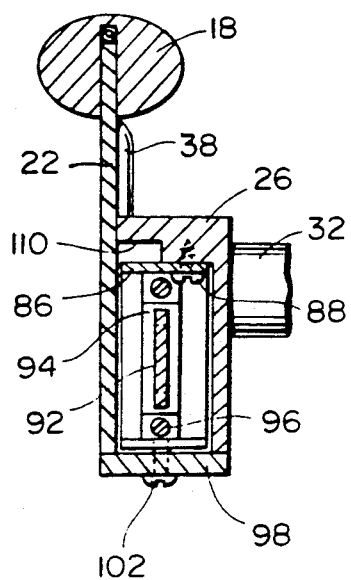
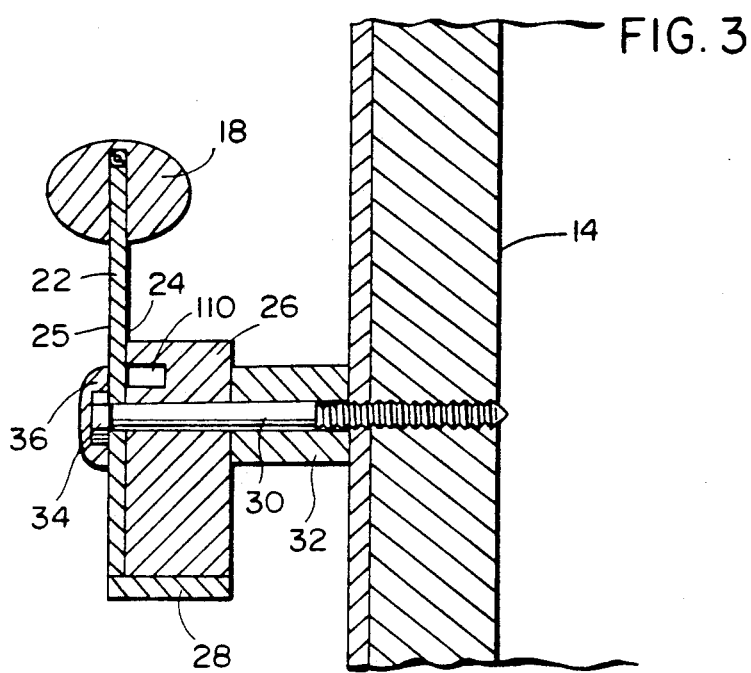
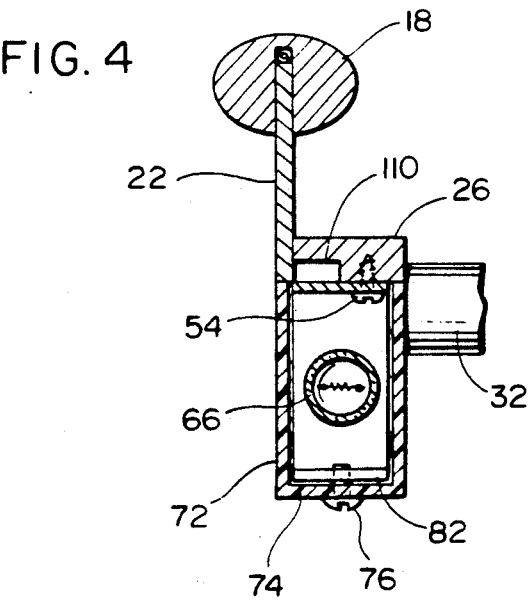

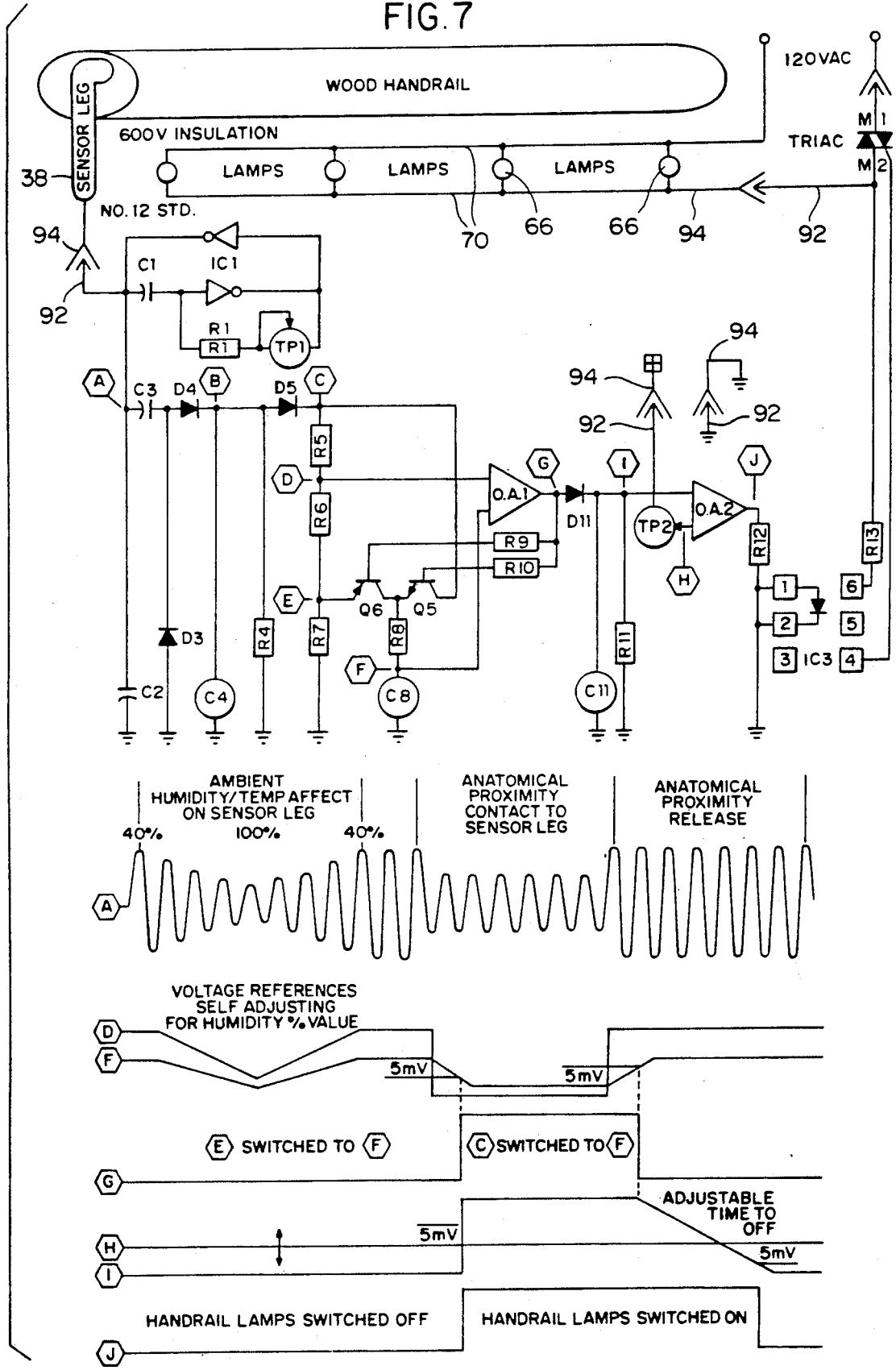

HANDRAIL ILLUMINATION SYSTEM

BACKGROUND OF THE INVENTION

1. Field of the Invention

The present invention generally relates to the illumination of stairways, walkways and similar areas which require illumination of areas in which people walk. More specifically, the invention is a handrail illumination system that will provide uniform distribution of illumination on stairways, walkways and the like that is completely integrated within a handrail and includes a control circuit which energizes light assemblies automatically when any point on the surface of a wood handrail senses anatomical contact thereby eliminating the necessity of locating and actuating manually operated wall switches. The anatomical contact switch will remain in the on position for the duration of anatomical contact with a time delay switching the lamps to off position when anatomical contact terminates. The illuminating lamps and associated structure are incorporated into housings built into the handrail and the control circuit structure is likewise incorporated into a housing incorporated into the handrail. The anatomical contact sensing switch and related circuit provides for a manual adjustment of the time delay for switching lamps off when anatomical contact is terminated with the handrail illumination system also including self-adjustment in response to variations in ambient conditions for maintaining appropriate operating conditions of the system. The handrail includes a horizontal portion when used with a stairway to extend over the landings for anatomically switching the lamps on prior to engaging the steps in a stairway. The handrail includes a gripping arrangement in which the side panels enable engagement by the thumb and fingers throughout the length thereof with the control circuit providing a safe and dependable illumination system.

2. Description of the Prior Art

Illumination of stairways, walkways and the like usually include ceiling or wall mounted light fixtures controlled by wall mounted switches or the like. However, individual light fixtures do not provide uniform and efficient lighting to the surfaces to be illuminated resulting in reduced illumination in certain areas along with attendant unsafe conditions. Also, light fixtures associated with stairways are difficult to maintain and present a hazard when it is necessary to service the light fixtures. The prior art also includes illumination devices associated with handrails. The following U.S. patents relate to this field of endeavor.

U.S. Pat. No. 2,766,372
U.S. Pat. No. 3,057,991
U.S. Pat. No. 3,131,871
U.S. Pat. No. 3,740,541
U.S. Pat. No. 3,813,071
U.S. Pat. No. 4,161,769

While the prior art such as U.S. Pat. No. 2,766,372 discloses the basic concept of an illumination features incorporated into a handrail, the prior art does not disclose the specific structure of the handrail, the light fixtures and control circuit arrangement incorporated into this invention and the prior art does not disclose the specific anatomical contact sensing switch assembly and related components of the control circuit incorporated into this invention.

SUMMARY OF THE INVENTION

An object of the present invention is to provide a handrail illumination system in which the components of the lamps and associated structure and the control circuit are integrally incorporated into the handrail which includes a standard wood handrail and a depending side panel to facilitate hand gripping of the handrail by engaging the palm of the hand with the wood handrail and the thumb and fingers with the side panel with the thumb and fingers being capable of sliding along the side panel throughout the length of the handrail.

Another object of the invention is to provide a handrail illumination system in accordance with the preceding object in which the handrail includes horizontal portions associated with the stairway landings with the handrail illumination system including anatomical contact or proximity sensing switch structure for switching the lamps on upon contact and switching the lamps off when contact terminates thereby facilitating illumination of the first step in a set of steps in a stairway.

A further object of the invention is to provide a handrail illumination system in accordance with the preceding objects in which the anatomical contact sensing switch has an adjustable time delay when contact terminates with the delay being reset for subsequent anatomical contact with the circuit also being self-adjusting in response to variations in ambient conditions to maintain optimum operating efficiency.

Still another object of the invention is to provide a handrail illumination system in accordance with the preceding objects in which the anatomical contact sensing switch includes a wire extending throughout the length of the wood handrail to enable anatomical contact or release to occur at any point throughout the length of the handrail.

A still further object of the invention is to provide a handrail illumination system which provides uniformly distributed illumination for stairways, walkways and other similar areas which is safe in operation, efficient in the use of electrical energy, effective in providing a secure and sturdy handrail that eliminates delays in locating and operating wall switches and assures that the illumination system will be operated when a person contacts the handrail.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is a transverse, sectional view taken substantially upon a plane passing along section line 2—2 on FIG. 1 illustrating specific structural details of the handrail.

FIG. 3 is a transverse, sectional view taken substantially upon a plane passing along section line 3—3 on FIG. 1 illustrating further structural details of the handrail and its mounting structure.

FIG. 4 is a transverse, sectional view taken substantially upon a plane passing along section line 4—4 on FIG. 1 illustrating further structural details of the handrail.

FIG. 7 is a schematic view of the control circuit for the handrail illumination system.

DESCRIPTION OF THE PREFERRED EMBODIMENT

Figure 1:
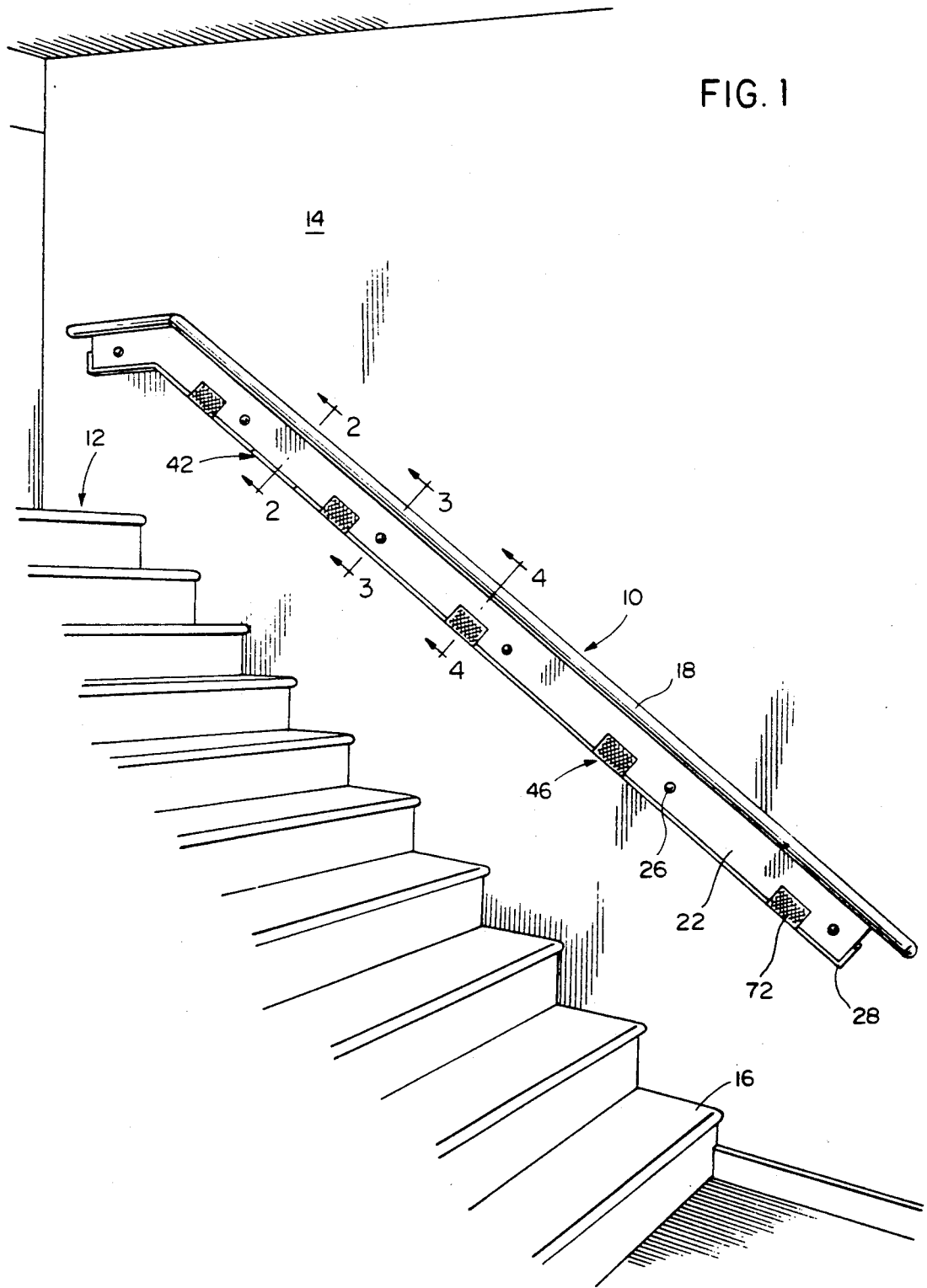
FIG. 1 is a perspective view of the handrail illumination system of the present invention associated with a stairway.

Referring now specifically to the drawings, FIG. 1 illustrates the handrail illumination system 10 of the present invention associated with a stairway generally designated by reference numeral 12 with the handrail illumination system 10 being mounted on a vertical wall surface 14 forming part of the stairway. As illustrated, the stairway 12 includes a plurality of conventional steps 16 and the handrail illumination system 10 is positioned above the steps 16 in an inclined manner. The handrail illumination system can also be used in association with horizontal walkways and other similar areas in which people walk and contact a handrail. The handrail illumination system of this invention eliminates the necessity of having lighting fixtures mounted in the ceiling, on the wall or the like and also eliminates manually operated switches which are hard to find and are usually located in an area not accessible to the general public. Also, the elimination of ceiling light fixtures, wall fixtures and the like eliminates hazards encountered when trying to service the light fixtures such as by changing the light bulbs and the like.

The handrail illumination system 10 includes an elongated handrail 18 of oval-shaped configuration as illustrated in FIGS. 2-4. The bottom surface of the wood handrail 18 is provided with a continuous groove or slot 20 extending to a point adjacent the upper surface of the handrail 18 but terminating in spaced relation to the upper surface. The slot 20 receives an elongated, continuous side panel 22 which includes planar, smooth, parallel external side surfaces 24 and 25 which depend from the handrail 18. Positioned alongside of the lower edge portion of the side panel 22 is a main body 26 constructed of wood with a wood trim molding 28 underlying the body 26 and the lower edge of the side panel 22 as illustrated. At spaced longitudinal points, anchor bolts or screws 30 extend through the side panel 22, the wood panel 26 and a wood dowel spacer 32 into the wall structure 14 for secure anchoring to the wall structure 14 which is of conventional construction and provided with supporting studs and the like. The outer end of the anchoring screw 30 is provided with a head 34 which is covered by a smoothly contoured trim cap 36.

The slot 20 in the handrail 18 also receives a sensing wire 38 which is located between the upper edge of the side panel 22 and the inner end of the slot or groove 20. The wire 38 extends downwardly in a notch 40 in the side panel 22 at one point therein and then extends downwardly alongside the side panel 22 at one location into the body 26 for connection with a control assembly generally designated by numeral 42 that is recessed in a recess 44 formed in the body 26. The body 26 also includes a plurality of light assemblies 46 received in recesses 48 in the body 26 with the spacing of the light assemblies being such that a uniform distribution of light will be associated with the steps 16. Also, as illustrated in FIG. 1, the handrail illumination system 10 includes a horizontal portion which extends over the landing adjacent the uppermost step 16 of the stairway and can also be provided with a horizontal portion extending over the lower landing next to the lowermost step 16 of the stairway so that persons approaching the stairway can actually grasp or contact the handrail 18 prior to engaging the first step.

Figure 6:
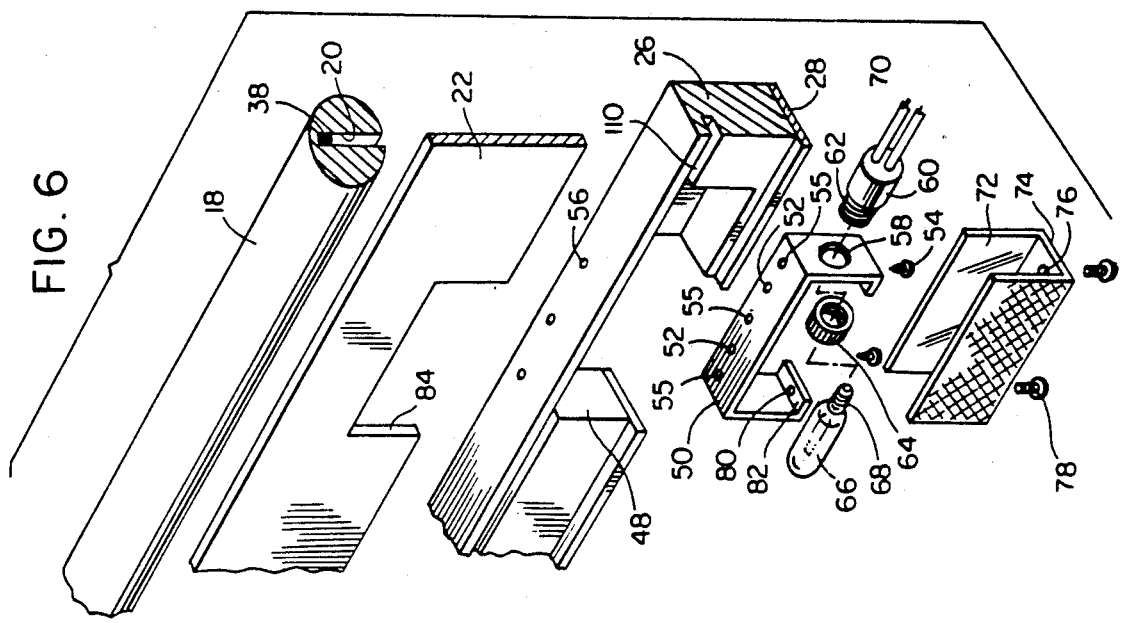
FIG. 6 is an exploded group perspective view of a handrail illustrating a housing for a lamp bulb and mounting structure.

FIG. 6 illustrates the specific construction of the light assembly 46 which includes a generally inverted U-shaped mounting bracket 50 having two holes 52 therein to receive mounting screws 54 which secure the bracket against the top surface of the recess 48. Also, ventilation holes 55 are provided in the bracket 50 for alignment with ventilation holes 56 in the top of the body 26 to enable dissipation of heat from the light assembly 46. One wall of the bracket 50 is provided with an aperture 58 receiving a lamp socket 60 therethrough with the lamp socket including an external screw threaded end 62 engaged with a lamp socket nut 64 which engages the innersurface of the bracket to secure the lamp socket 60 in place. A lamp 66 of the showcase type is provided with a conventional threaded base 68 which threads into the lamp socket 60 in a conventional manner with the lamp socket 60 including wires 70 connected to the control circuit. The bottom of the bracket 50 and the sides thereof are closed by a U-shaped lens 72 which includes a bottom 74 with apertures 76 receiving fastener 78 which engage apertures 80 in the inturned flange 82 at the bottom end of each end wall of the bracket 50 thus mounting the lens 72 in overlying relation to the bottom and both sides of the bracket 50 as illustrated in FIG. 4 with one side wall of the lens being flush with the surface 26 of the side panel 22 and the other side wall of the lens being flush with the surface of the wood body 26 as illustrated in FIG. 4. FIG. 6 also illustrates the notch or recess 84 in the side panel 22 which receives the lens and a portion of the bracket 50.

Figure 5:
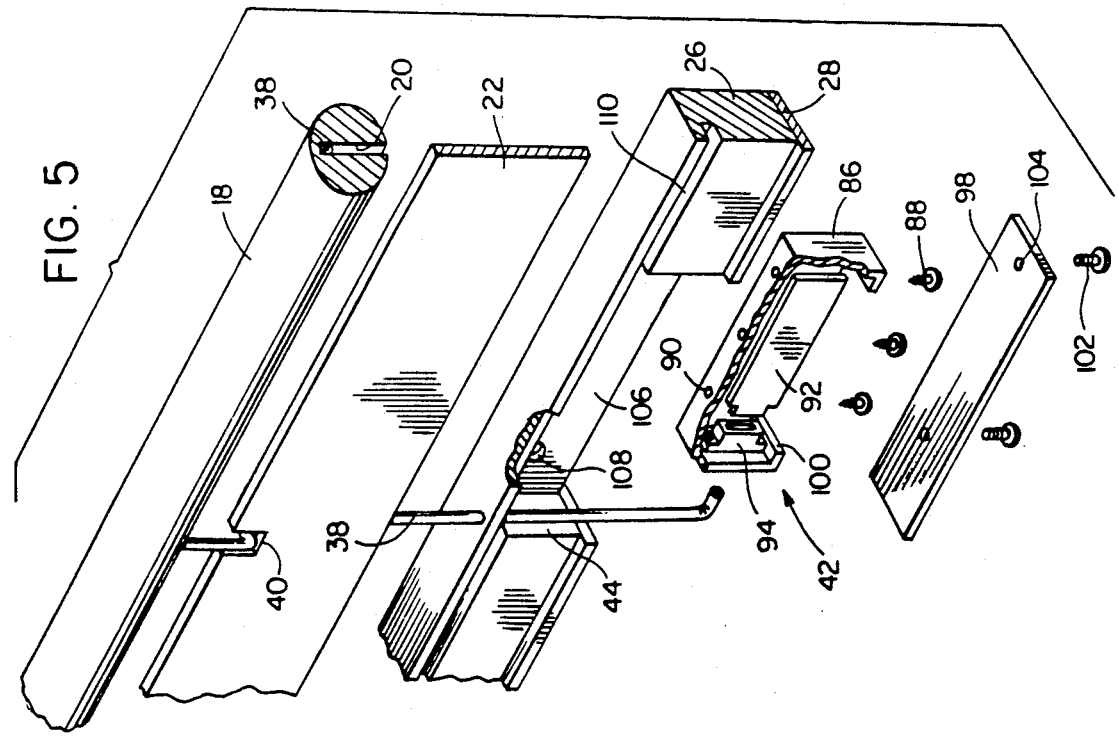
FIG. 5 is an exploded group perspective view of the components of the handrail and the housing structure for a printed circuit board.

FIG. 5 illustrates the control assembly 42 which includes a generally inverted U-shaped bracket 86 received in recess 44 and secured to the upper surface thereof by screw threaded fasteners 88 extending through apertures 90 in the bracket 86. A printed circuit board 92 for power and electronic control is positioned in the bracket 86 and supported by an edge board connector 94 secured to the end wall of the bracket 86 by fasteners 96. A bottom cover 98 is secured to inturned flanges 100 on the bracket 86 by fasteners 102 extending through apertures 104 in the cover 98. The wall 106 of the recess 44 includes an aperture 108 for receiving AC and DC wiring to the exterior of the bracket 86 and the wire 38 is likewise introduced to the exterior of the bracket 86 which forms a wiring compartment. The wood body 26 includes a longitudinal passageway 110 which enables passage of wiring from the control assembly 42 to the light assemblies 46. As illustrated in FIG. 2, the bracket 86 is received in the recess and secured thereto with the side panel 22 forming a closure for one side of the bracket 86 and the wall 106 of the recess 44 forming a closure for the other side of the bracket 86 thus forming a wiring compartment for connecting a power source to the wires extending to the light assemblies with the control assembly providing control of the light assemblies in response to anatomical contact of persons gripping or contacting the handrail 18. As illustrated in the drawings, the side surfaces 24 and 25 of the side panel 22 provide continuous smooth surfaces to be engaged by the thumb and finger tips of a person gripping the handrail and sliding the hand along the handrail with the palm of the hand engaging the upper surface of the handrail in a conventional and well known manner.

As described, the handrail illumination system of the present invention eliminates the use of ceiling or wall mounted light fixtures which are usually controlled by a manually operated switch mounted on a wall or other convenient location. Ceiling and wall mounted fixtures do not provide uniform lighting on a stairway or walkway and present considerable hazards when it is necessary to service the light fixtures such as by changing light bulbs and the like. The present invention includes a totally integrated handrail illuminating system which produces a uniform distribution of illumination on stairways and walkways. This arrangement reduces power consumption since the lamps are more direct and uniform in relation to the illuminated surface and eliminates the installation of wall switches and also eliminates the necessity of locating and fumbling with the wall switches when necessary. The vent holes above each light fixture discharges heat generated by the lamps and, if desired, a vinyl or other type of wall covering can be applied to the exposed surface of the side panel 22 to match any wall decor. Also, the use of the relatively thin side panel which is continuous from end to end improves handrail gripping by reducing the space between the thumb and fingers when the handrail is grasped thus increasing the gripping capability of a person using the handrail.

This also enables the hand to slide continuously along the entire length of the handrail with the thumb and fingers folded into engagement with the side panel. The wood handrail may be a stock item provided with the slot or groove 20 therein and standard components may be used for the brackets and other structure with the lens being of transparent or translucent construction to diffuse the light but enable emission of light downwardly and to both sides thus providing a 3-directional light.

The side panel 22 may be constructed of a non-conductive rigid material providing sufficient rigidity to support the handrail 18. The side panel 22 is bonded in the groove or slot 20 in the handrail 18 by suitable adhesive type bonding material or any other suitable permanent bonding material. Likewise, the side panel 22 is bonded to the body 26 and also secured by the anchor screws or bolts with the trim molding 28 also being bonded to the wood body 26. The sensor wire 38 which is in the form of a sensor leg may be a conventional insulated number 12 gauge stranded copper wire which is also bonded in place in the upper end of the slot or groove 20. The control circuit is, in effect, a capacitor switch with the sensor leg 38 serving as the capacitor. This structure provides an anatomical contact or proximity sensor switch or anatomical proximity electronic switch and can be used as illustrated or for other purposes in which anatomical contact will actuate a switch. The use of the anatomical contact sensing switch enables the horizontal portion of the handrail system 10 to switch the lamps on prior to the person using the stairway being positioned at the critical upper or lower first step. The lamps 66 are switched on when the surface of the wood handrail is contacted at any point and remains on the for the duration of such anatomical contact. When anatomical contact is terminated or released, an adjustable time delay is provided for switching the lamps off and the delay is reset for switching lamps off after a subsequent anatomical contact. Therefore, anatomical contact or anatomical release at any point on the length of the handrail will switch the lamps on or switch the lamps off after a time delay. The handrail 18 is isolated from the heat of the lamps 66 or ballast heating if used. The light output through the lens is tridirectional and the wire passageway 110 is isolated from lamp heat by the bracket 50 and any heating that may occur at the printed circuit board by the bracket 86 with the brackets dispersing heat over their entire surface area. The lamp socket bracket not only serves as a support for the lens but also a fire barrier to the main wood body. Also, the control circuit includes a gradual self-adjusting of voltage references as the ambient humidity and temperature conditions vary in order to maintain voltage differentials.

FIG. 7 illustrates the details of the control circuit with the purpose of the circuit being to switch the electric lamps on when anatomical proximity contact is made to any point on the length of the handrail which has the sensor leg therein. The lamps are retained in on condition for the duration of anatomical proximity contact to the sensor leg 38. The control circuit also delays switching the lamps off when anatomical proximity contact is released with the delay to the off position being manually set with TP2. The circuit also resets time to off condition when anatomical proximity contact is remade during adjustable time to off portion of the cycle and to gradually self-adjust voltage references at junctions C, D, E and F as the ambient/temperature varies which affects the sine wave at A. High ambient humidity on the sensor leg 38 decreases amplitude of the sine wave and low ambient humidity on the sensor leg increases amplitude of the sine wave thus maintaining the voltage differentials when the circuit is inactive. The circuit also switches voltage reference value at junction F in a delayed mode, above or below junction D depending on anatomical contact or release, to provide direct and uniform light distribution on stairways and walkways and eliminate fumbling for wall switches and isolate the components electrically.

As illustrated in FIG. 7, the circuit functions to generate a sine wave at A with C-1 in conjunction with two inverters IC-1 with C-1 setting the initial operating frequency and R-1 limiting the minimum amplitude of sine wave at A. When the sensor leg 38 is plugged into junction A, capacitive loading occurs and the sine wave decreases in amplitude with TPI being trimmed to increase or decrease the amplitude of sine wave A and C-2 is optional and can be used to load the sine wave A. The sine wave is coupled by C-3 to diodes D-3 and D-4 which form a voltage doubler circuit with a DC voltage being produced at junction B with C-4 and R-4. Diode D-5 is used for blocking purposes and a voltage divider circuit is implemented from C to ground with the voltage differential between C and D being set at 50 millivolts by R-5. Another voltage differential between D and E is also set at 50 millivolts with R-6 and R-7 is sized to provide the remaining voltage drop from E to ground. D is the voltage reference to the inverting input of operational amplifier 1 and F is the voltage reference to the non-inverting input of operational amplifier 1. A voltage decrease or increase at F is delayed with R-8 and C-8 and Q-5 is non-conducting at this point while R-9 and R-10 are bias resistors for Q-6 and Q-5 respectively. In the quiescent state a gradual increase or decrease of ambient humidity on the sensor leg 38 decreases or increases the amplitude of the sine wave at A junctions C, D, E and F follow the amplitude variations at A as a gradual DC voltage decrease or increase and junction E is switched to junction F by Q-6. Since the ambient humidity rate of change is gradual, junction D voltage is unable to drop the required 5 millivolts below junction F thus maintaining voltage differentials of C, D. E and F and prevents a false output at G which activates the remainder of the circuit.

When anatomical proximity contact is made to the sensor leg 38 in the handrail 18, the amplitude of sine wave at A decreases instantly and junctions C, D and E follow A as a DC voltage drop with the F voltage drop being delayed with R-8 and C-8 which condition allows D voltage to drop the required 5 millivolts below F voltage and provide an output at G. With an output voltage at G, Q-6 is switched off through R-9 and Q-5 is switched on through R-10. The voltage value of C is switched by Q-5 to F and the value of E to F is switched off by Q-6 which maintains the output voltage at G for the duration of anatomical contact. The output at G provides a voltage through blocking diode D-11 to the non-inverting input of operational amplifier 2 at junction I. The center tap of TP2 is a manually adjustable voltage reference to the inverting input of operational amplifier 2 at junction H and C-11 and R-11 serve as a timed discharge circuit at junction I. Voltage at junction I rises above voltage at H by a required 5 millivolts and produces an output voltage at J. R-12 is a limiting resistor to the LED of the IC-3 optical coupler which is switched on and triggers the gate of the triac to switch the handrail lamps on.

When anatomical proximity to the sensor leg 38 terminates or is released, the sine wave A is restored to its initial amplitude and junctions C, D and E follow A as a DC voltage increase. Voltage increase at F is delayed with R-8 and C-8 which condition allows voltage D to rise above voltage F by the required 5 millivolts and discontinue the output at G. At this time, C-11 starts to discharge through R-11 to ground and when C-11 has discharged junction I to 5 millivolts below the adjusted voltage at junction H, the output voltage at junction J is discontinued and the triac is switched off. The time to off can be reset if anatomical proximity contact is restored before voltage at junction I drops below junction H by the required 5 millivolts.

The gradual self-adjustment of voltage references at junctions C, D, E and F occurs as the ambient humidity/temperature varies and affects the sine wave at A with high ambient humidity on sensor leg 38 decreasing amplitude of the sine wave A and low ambient humidity on sensor leg 38 increasing amplitude of sine wave A which maintains the aforementioned voltage differentials when the circuit is inactive. The control circuit also switches voltage reference value at junction F in a delayed mode above or below junction D dependent on anatomical contact or release and the circuit also switches a high AC voltage with a lower DC voltage and provide an isolation of voltage with IC3.

With this arrangement of the components including the handrail, supporting structure, light assemblies and control circuit, an effective handrail illumination system has been provided which is controlled by anatomical contact and termination or release of such contact for assuring adequate and uniform illumination of stairways, walkways and in similar installations where an area or surface needs to be illuminated to provide safe, well-lit conditions.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A handrail illumination system for illuminating a stairway, walkway or other surface area requiring illumination, said system comprising a handrail in the form of an elongated member having a generally smooth external surface for gripping engagement by persons using the handrail, a longitudinally continuous panel connected with and extending downwardly from the lower surface of the handrail, an elongated body connected with said panel, support means connected with the body and adapted to be supported from a building component and a plurality of illumination means mounted in said body and exposed to a bottom exterior surface of the body for illuminating areas below the handrail, said handrail including means energizing and deenergizing the illumination means in response to anatomical proximity contact with the handrail and release of anatomical proximity contact with the handrail.

2. The system as defined in claim 1 wherein said means to energize and deenergize the illumination means includes a continuous sensor leg incorporated into the handrail adjacent an upper exterior surface thereof, said sensor leg being in the form of an insulated conductive wire operatively connected to the illumination means by a control circuit.

3. The system as defined in claim 2 wherein said handrail is constructed of wood and provided with a longitudinal groove extending upwardly from a bottom surface thereof, said sensor leg being positioned in the groove, said panel also being positioned in said groove with the panel being bonded thereto to retain the sensor leg against the groove and spaced above the bottom surface of the handrail.

4. The system as defined in claim 3 wherein each of said illumination means includes a downwardly opening recess in said body, a mounting bracket in said recess, a light socket mounted in said bracket, electrical wiring connecting the socket to said control circuit, said bracket and recess in the body including an open bottom area and two open side areas, and a generally U-shaped lens closing the open bottom area and open side areas to enable transmission of light rays from a lamp positioned in the socket in three directions.

5. The system as defined in claim 4 wherein said body is constructed of wood and provided with a passageway for electrical wiring.

6. The system as defined in claim 5 wherein said panel is substantially thinner than the transverse cross-sectional area of the handrail and body to provide contact surfaces for a thumb and opposing fingers on a person's hand gripping the handrail with the upper surface of the handrail engaging the palm of the hand to facilitate sliding movement of the gripping hand along the handrail.

7. The system as defined in claim 6 wherein said handrail includes a horizontally extending end portion for illuminating a stairway landing for anatomically switching lamps on prior to a user coming into contact with a first step in a stairway.

8. The system as defined in claim 7 wherein said control circuit switches all the lamps on in response to anatomical proximity contact with the handrail and switches them off when anatomical proximity contact is released, said control circuit including time delay means to delay the lamps being switched off after release of anatomical proximity contact.

9. The system as defined in claim 8 wherein said time delay is adjustable to assure continuous illumination of the illumination means for a predetermined time period after anatomical proximity contact release.

10. The system as defined in claim 9 wherein said control circuit includes self-adjusting of the sensitivity of the sensor leg and control circuit in response to ambient humidity/temperature variations.

11. The system as defined in claim 10 wherein said control circuit includes a recess in said body spaced from the plurality of illumination means, a mounted bracket in said recess, a printed circuit board mounted on said bracket and a removable closure for the recess to provide access to the control circuit.

* * * * *